United States Patent [19]
Elevitch

[11] 3,767,560
[45] Oct. 23, 1973

[54] METHOD AND APPARATUS FOR FORMING ELECTROPHORESIS APPARATUS AND THE LIKE

[76] Inventor: Franklin R. Elevitch, 430 Nevada St., Palo Alto, Calif. 94301

[22] Filed: Jan. 12, 1972

[21] Appl. No.: 217,361

Related U.S. Application Data

[60] Division of Ser. No. 877,378, Nov. 17, 1969, Pat. No. 3,635,808, and a continuation-in-part of Ser. No. 300,341, Aug. 6, 1963, abandoned, and a continuation-in-part of Ser. No. 579,089, Sept. 13, 1966, abandoned, and a continuation-in-part of Ser. No. 664,133, Aug. 29, 1967, Pat. No. 3,479,265.

[52] U.S. Cl............................ 204/299, 204/180 G
[51] Int. Cl.............................................. B01k 5/00
[58] Field of Search.................... 204/180 G, 180 S, 204/299; 210/198 C

[56] References Cited
UNITED STATES PATENTS
3,554,894 1/1971 Zemel................................ 204/299
3,582,490 6/1971 Zemel........................... 204/180 G
3,691,054 9/1972 Cawley............................. 204/299

Primary Examiner—John H. Mack
Assistant Examiner—A. C. Prescott
Attorney—Edward B. Gregg et al.

[57] ABSTRACT

Thin film apparatus for electrophoresis, chemical analyses and the like is provided, the film being an aqueous gel such as agarose gel; continuous and semi-continuous methods of production are provided; and apparatus for such methods.

3 Claims, 11 Drawing Figures

PATENTED OCT 23 1973 3,767,560

METHOD AND APPARATUS FOR FORMING ELECTROPHORESIS APPARATUS AND THE LIKE

DESCRIPTION

This application is a division of my copending application Ser. No. 877,378 filed Nov. 17, 1969 and to be issued on Jan. 18, 1972 as U.S. Pat. No. 3,635,808. This application is a continuation-in-part of the following copending applications: Ser. No. 300,341 filed Aug. 6, 1963; Ser. No. 579,089 filed Sept. 13, 1966 (both abandoned) and Ser. No. 664,133 filed Aug. 29, 1967, now U.S. Pat. No. 3,479,265 granted Nov. 18, 1969.

In my copending applications referred to above thin film methods and apparatus for conducting electrophoresis (and subsequent fluorometry or densitometry) and for conducting radial diffusion operations are described.

It is an object of the present invention to provide improvements in such apparatus and methods.

It is a particular object of the present invention to provide improved separation of the cover of the apparatus from the base so that none or a negligible quantity of the film of aqueous gel adheres to the cover.

It is a further object of the present invention to provide improvements in the process of manufacturing such apparatus.

Other objects of the invention will be apparent from the ensuing description and the appended claims.

Certain forms of the invention are illustrated by way of example in the accompanying drawings in which.

In the apparatus of my invention the film of permeable gel which provides the medium for migration of specimens, reagents and the like is an aqueous gel and it is preferably a thin film, usually not more than one millimeter thick and preferably not more than about 0.5 millimeter thick. However, in some embodiments of the invention the film of gel may be thicker. This film is permeable to reagents such as those mentioned hereinafter and to biological materials such as proteins, blood serum, etc., such that the selected reagents, specimens, etc., will migrate by capillary effect or under an applied voltage.

The thin films of gel used in accordance with my invention are also preferably uniform in thickness, and preferably do not depart by more than about 10 percent from the average thickness.

The thinness and uniformity of these films are highly advantageous. The gel thinness permits rapid migration under an applied voltage of 10–15 volts per centimeter or more without the need for applied cooling and without desctructive heat build-up which would dry the gel or denature the material migrating into the film, such as proteins. This rapid migration without elaborate cooling equipment and without destructive heat build-up is advantageous in electrophoresis because it permits the use of high voltages with attendant high speed of separation, and without applied cooling, and it also permits the use of inexpensive equipment which can be supplied to the customer ready for use and which is inexpensive enough to discard after a single use. In the radial diffusion technique thin films are advantageous because they allow the use of minimum quantities of expensive reagents such as antisera and they also provide sharp end points. In all cases uniformity of film thickness is advantageous because results are more reliable.

Advantages of thin films of gel have been noted heretofore. See Wadsworth, "A Slide Microtechnique for the Analysis of Immune Precipitates in Gel," Int. Arch. Allergy, vol. 10, pp 355-360 (1957). However, to my knowledge, prior to my inventions practical apparatus employing thin films of gel which lends itself to manufacture in a form ready for use, which can be stored for extended periods of time without deterioration, which is simple to use and which is sufficiently inexpensive that it can be used once and discarded, has not been available.

Figure 1:
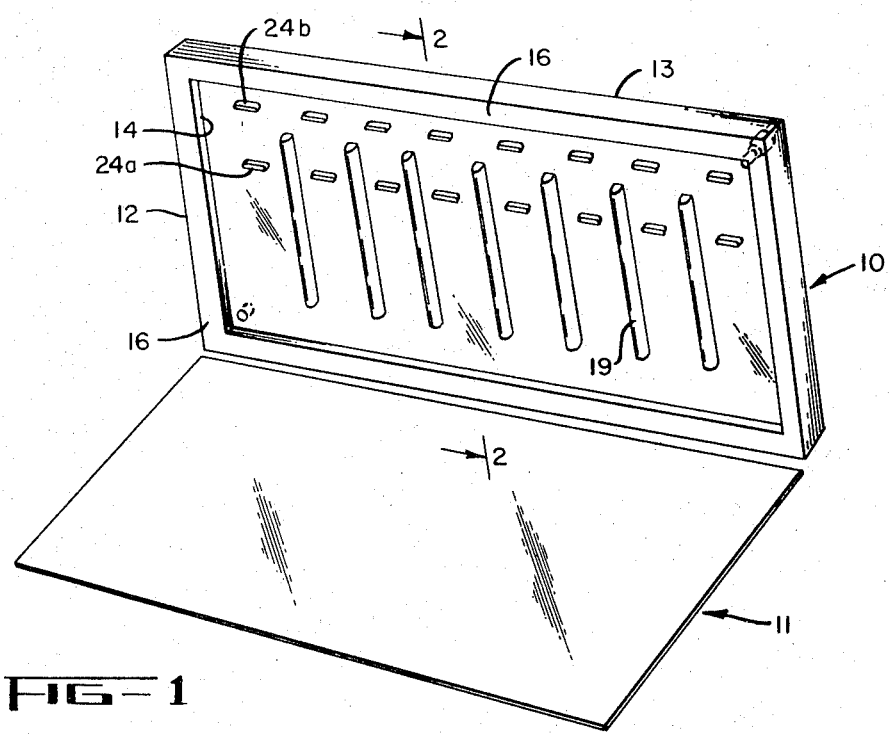
FIG. 1 is a perspective view of one form of apparatus in accordance with the present invention showing the cover and the base.
Figure 2:
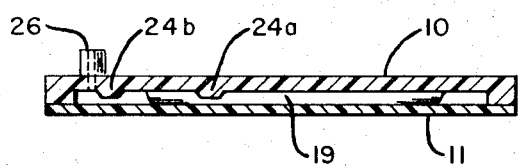
FIG. 2 is a section taken along the line 2—2 of FIG. 1 but with the base applied to the cover.

In FIGS. 1 and 2 one form of apparatus is shown which provides these advantages. Referring now to FIGS. 1 and 2, a complete mold is there shown which comprises a cover 10 and a base 11 which may be made of the same or different materials such as polystyrene, polyethylene, polypropylene, etc. Polystyrene is a preferred material because of its superior machining and fabrication qualities and because it is transparent and non-fluorescent. Non-fluorescence is of particular importance in applications where fluoremetry is used because a fluorescent material is incompatible with this technique. For example, where the separated proteins are stained with a dye which fluoresces, background fluorescence of the material of the base would be incompatible. Polyethylene and polypropylene meet these requirements but their machining and/or fabrication qualities, although acceptable, are not as good as those of polystyrene. Other materials of construction may be used. The cover 10 preferably has substantial thickness and is rigid while the base 11 is preferably thin and flexible. Transparent materials such as polystyrene, polypropylene and polyethylene are preferred although where reflectance methods of fluorometry are used an opaque material may be used. However, even in those cases transparent materials of construction are preferred because, among other things, they permit visual inspection to detect bubbles, voids, etc.

The base 11 preferably has a flat inner surface. The cover 10 is provided with a rim formed by end walls 12 and side walls 13 which define a mold cavity 14 and which determine the depth of the mold cavity and therefore the thickness of the resulting film of gel. The rim 12, 13 provides a face 16 to which a pressure sensitive adhesive is applied as explained below. The inner surface of the cover 10 is formed with risers 19 and well forming projections 24a and 24b. As shown in FIG. 2, the risers 19 have the same height as the rim 12, 13 and they are intended to contact the base 11 when the apparatus is assembled. The risers 19 and the rim 12, 13 determine the depth of the mold cavity and therefore the thickness of the film of gel. They are formed with accuracy for this purpose so that the film of gel has a uniform thickness. Preferably the mold cavity depth and therefore the film thickness are less than 1 mm., preferably about 0.3–0.5 mm.

Figure 3:
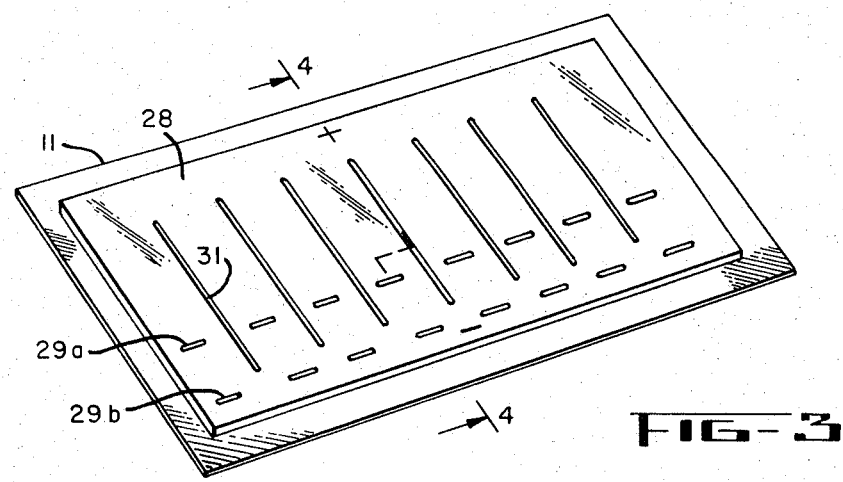
FIG. 3 is a perspective view of the base of the apparatus of FIG. 1 separated from the cover and with a film of gel adhering to it.
Figure 4:
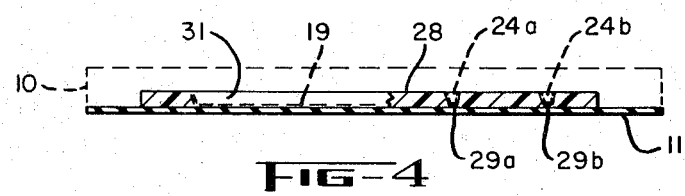
FIG. 4 is a cross section taken along the staggered line 4—4 of FIG. 3.

The well forming projections 24a and 24b, as appear in FIG. 2, preferably terminate short of the base 11 so that the resulting sample receiving wells do not extend to the base. This is shown in FIG. 4 and it is advantageous because, if the wells extend through the base, undercutting of solution placed in the wells may occur with resulting fuzzy or ambiguous results. In FIGS. 3 and 4 a layer of gel 28 is shown adhering to the base 11, such film being formed with sample receiving wells 29a and 29b and with channels 31 formed by the well forming projections 24a and 24b and the risers 19, respectively. The cover 10 is provided with filling and venting openings 26. Caps (not shown) may be provided to close the vents but preferably the vents 26 are heat sealed to close them.

In FIG. 4 the cover 10 is shown in broken line, the purpose being to illustrate how the projections 24a and 24b and the risers 19 remain within the wells 29a and 29b and the channels 31 until such time as the base 11 with the adhering film of gel 28 is stripped from the cover (see below). This is an important advantage of the construction of my invention because the gel, being aqueous (about 90 percent water), will leak into the wells 29a, 29b, also into the channels 31. Therefore, without the projections 24a, 24b and risers 19, the wells and channels would be filled and their integrity would be destroyed. By reason of the projections 24a, 24b and the risers 19 their integrity is preserved during long periods of storage, and by reason of the edge sealing described below, the integrity of the entire film against evaporation is also preserved during long periods of storage.

As desribed in my copending applications above mentioned the gel 28 is adherent to the base 11 and is non-adherent to the cover 10 such that, when it is desired to separate the base it may be stripped from the cover wih the film of gel 28 adhering to the base and completely separated from the cover, to which none or a negligible quantity of the film adheres. A material of construction may be selected for the cover which is non-adherent to the gel and another material may be selected for the base which is adherent. An example of non-adherent materials for the cover are various polysiloxanes such as Silgard, which is a trademark of Dow Corning Corporation which is described in a brochure of that company, Bulletin 07-2713, dated March, 1968. It is described as a transparent, room-temperature curing, solventless resin supplied as a nearly colorless, free flowing, low viscosity fluid having a 100% silicone resin content. It is mixed at or shortly before before the time of sue with a curing agent in the proportions of 1 part by weight of curing agent and 10 parts by weight of resin. Other data and information regarding this resin will be found in said bulletin. Other room-temperature curing silicone resins may be used instead of Silgard, which is further identified in the aforesaid publication as Silgard 184. Examples of adherent materials for the base are polystyrene, polyethylene and polypropylene. However, it is preferred to rely upon a release agent to prevent adherence of the gel to the cover 10, which may therefore, be made of the same material as the base 11. As set forth in my copending application Ser. No. 664,113 now U.S. Pat. No. 3,479,265, a silicone release agent may be employed for this purpose.

In accordance with the present invention an improved type of release agent and an improved method of applying the release agent are provided for the cover 10. For this purpose a solution of paraffin wax in a volatile solvent is applied to the cover 10 by dipping, spraying or other means. A suitable wax, when the cover is made of polystyrene having a softening point of about 90°C, is a refined paraffin wax having a melting point (AMP) of 128°/130°F; a color (Saybolt, ASTM D156) of +30; and oil content (ASTM D721)=0.3%; a penetration at 77°F and 100°F (ASTM D134) = 17 and 105, respectively; and a viscosity at 180°F and 210°F (SSU, ASTM D2161) = 41.6 and 38.2, respectively. Any other paraffin wax, and in fact any other thermoplastic, essentially hydrocarbon, hydrophobic material may be used which will adhere to the cover, which is non-adherent to an aqueous gel such as agarose gel, which is solid at temperatures up to about 70°C and which melts substantially below the melting point of the cover material. A solution, e.g., in low boiling petroleum ether (b.p. = 36–40°C), is applied by any suitable means as by dipping or spraying. It does not matter that the top portion of the cover is also coated inasmuch as the amount wasted is not great and does not interfere with subsequent use of apparatus. If the solution is applied by dipping, the cover may be allowed to drain. If the solution is applied by spraying, it is applied so as to provide a uniform coating of wax on the surface.

Next, the cover is dried by air drying at ambient temperature, by means of applied heat such as a current of hot air or by any other suitable means. This leaves a very thin coating of wax on the inner surface of the cover. This coating is uniform but contains small voids. To eliminate these voids, the coatiang of wax is melted and glazed by a mild application of heat, as by means of a current of hot air, by holding over a hot plate or otherwise. The temperature and time of heating are such that glazing of the wax coating occurs but without damage to the material of which the cover 10 is constructed. By this means the coating on the cover is made uniform and voids are filled in by coalescence.

Before or after this wax coating operation, preferably afterwards, a pressure sensitive adhesive such as a rubber cement is applied to the face 16 of the rim 12, 13 and/or to the corresponding marginal area of the base 11. Preferably the pressure sensitive adhesive is applied to the face 16 of the rim 12,13 of the cover 10. Also heat sealing may be employed instead of adhesive.

Next the cover 10 and base 11 are assembled as shown in FIG. 2 and sufficient pressure is applied, as by means of a platen press, to adhere the base firmly to the cover. This pressure brings the face 16 of the rim 12,13 of cover 10 into firm, uniform contact with the cover 11 and it also brings the risers 19 into firm contact with the cover 11, so that the space between the cover 10 and base 11, hence the thickness of the resulting film of gel is uniform. Then a melted gel is introduced through one of the openings 26, air being vented through the other opening. A suitable gel formulation consists of 10 percent by weight of sucrose and and 1 to 1.2 percent by weight of agarose dissolved in an electrolyte solution. The electrolyte solution may be an aqueous solution of sodium barbital and HCl having a pH of 8.6. Many such aqueous gels and aqueous electrolytes are well known. Other gelling agents such as starch, agar, acrylamide, etc. may be used in place of agarose. The formation of such gels is well known in the art. A gel formed in accordance with the complete formulation given above is advantageous because it is transparent and non-fluorescent and it has good properties for migration of materials by capillary effect and/or under a voltage gradient as in electrophoresis.

Preferably the gel is degassed before it is placed in the mold. It has been found that, on occasion, the film of gel forms gas bubbles, especially if the apparatus is stored in a hot climate or in hot surroundings. Such degassing is readily accomplished by placing the gel in a vacuum vessel, applying sufficient heat to melt it and subjecting it to a vacuum of about 28 inches of mercury for about 5–10 minutes. The gel may be stirred to accelerate degassing.

Preferably also the gel has incorporated in it a very small amount, e.g., about 0.05 to 0.2 percent by weight of a polyvinyl alcohol. A suitable polyvinyl alcohol is a 99 percent hydrolyzed (i.e., 98 percent of the acetyl groups of polyvinyl acetate are removed by hydrolysis), having a viscosity of 28–32 centipoises. This is used as a 4% aqueous solution. I have found that the inclusion of polyvinyl alcohol considerably improves the release properties of the gel from the cover.

After the mold (which is in a press, see above) has been filled with gel (which is supplied in warm, molten condition), as indicated by an overflow from the venting spout 26, the caps 27 are applied to the spouts 26 or the spouts 26 are heat sealed and, after the gel has cooled and solidified, the apparatus is ready for storage, shipment and use.

In use, as described in my copending application Ser. No. 664,113, now U.S. Pat. No. 3,479,265, the base 11 is peeled from the cover and carries with it a thin, uniform film of gel. This film of gel is formed with troughs or channels 31 formed by the risers 19 and sample receiving wells 29a and 29b formed by the well forming projections 24a and 24b. By reason of retention of the cover 10 and its projecting risers 19 and well forming projections 24a and 24b until the time of use the integrity of the troughs and wells is preserved. Specimens are placed in the wells 29a and/or 29b. If separation by electrophoresis is to be carried out, the base 11 with its adhering film of gel is placed in a suitable electrophoresis apparatus and is subjected to a suitable voltage gradient to effect separation of proteins. As described in my copending application Ser. No. 664,113, now U.S. Pat. No. 3,479,265, by reason of the uniformity of the layer of gel, sharp separations are produced and because of the thinness of the gel, high voltage gradients (e.g., 10 to 15 volts per centimeter) can be applied without external cooling. Rapid separations are effected, e.g., in one-half hour to one hour. The apparatus is then placed in suitable analytical equipment, after suitable staining and other processing. The analytical equipment may be a fluorometer or a densitometer to measure quantitatively the separated proteins. If the apparatus is to be used in the radial diffusion-precipitin technique, the body of the gel will have been impregnated with a suitable reactant such as an antiserum and specimens, e.g., blood serum, will be placed in the sample receiving wells and will diffuse outwardly and will form rings (which can be made visible or more readily visible by staining) by reaction with anti-serum. Measurement of the diameters of these rings and of the diameters of rings produced by control specimens of known material will provide a quantitative measure of the material to be measured. Further details will be found in my copending application Ser. No. 664,113, now U.S. Pat. No. 3,479,265.

In the foregoing description, the film of gel is described as having sample receiving wells formed in it by well forming projections. In another embodiment of the invention the film of gel is made without such wells, in which case the cover 10 is formed without the projections 24a, 24b and if desired, without the risers 19. Specimens may be applied to the plain surface of the film of gel and caused to migrate radially outwardly as in the radial diffusion technique, or to migrate directionally as in electrophoresis. Wells may be formed in the film after the cover 10 is removed, or the cover 10 may be formed with holes which are sealed during storage, then opened at the time of use to permit introduction of specimens. Alternatively, a template with holes in it may be placed over the exposed film (after removal of the cover) and specimens introduced through the holes.

Figure 5:
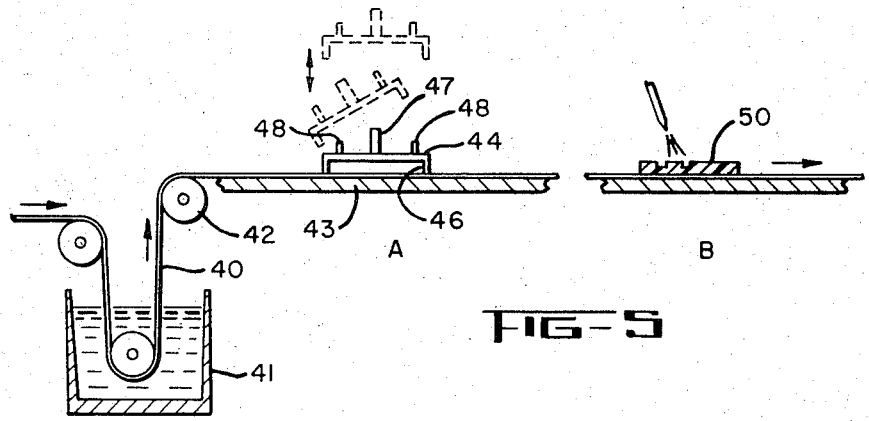
FIG. 5 is a diagrammatic drawing of a semicontinuous method for manufacturing apparatus such that as that shown in FIG. 1.

In accordance with another embodiment of the invention, apparatus such as that shown in FIGS. 1 and 2 may be made in a semi-continuous way. Referring to FIG. 5 a continuous tape 40 supplied from a roll (not shown) is provided, such tape being, e.g., polystyrene and having the same thickness as the base 11 in FIG. 1, e.g., about 0.005 inch. This tape may be passed through a tank 41 filled with a cleaning solvent such as isopropyl alcohol although such may be unnecessary. The tape is guided around a guide roller 42 and is dried by means of a current of hot air (not shown). The tape then passes along a table 43 through a film forming station A and pauses at timed intervals at that station while a mold 44 is lowered into the tape. The mold 44 has a rim which forms a mold cavity 46 having the desired depth and horizontal shape and dimensions. The mold 44 is shown, for simplicity, without well forming projections and risers such as 24a, 24b and 19 but it may be provided with them. A rod 47 connected to a suitable operating mechanism (not shown) lowers the mold from the raised position shown in broken lines to the lowered operating position shown in solid lines in contact with the tape. During this pause or dwell and while the mold is in the firm contact with the tape, a gel is injected from a suitable source (not shown) through one of the spouts 48. Air is vented through the other spout along with excess gel. The gel is introduced in liquid or semi-solid condition and the dwell at station A is long enough to permit such filling operation and to allow the gel to solidify. If desired a current of cold air may be applied to the mold 44 and/or to the under surface of the table 43, or cooling liquid may be passed through passages (not shown) in the mold and/or table to hasten solidification of the gel. The mold is then tilted to the angular position shown in dotted lines to release it from the solidified film of gel and it is then raised to the horizontal position, also shown in dotted lines, to allow the tape to move another increment. Preferably the interior of the mold will have been coated with a suitable release agent unless the material of construction is inherently non-adherent. Suitable release agents are silicone release agents and paraffin wax as described above. The tape 40 also pauses at an applicator station B where a mold cover 10 identical with that shown at 10 in FIG. 1 may be applied. This application may be manual or it may be done automatically by a suitable mechanism (not shown) during a dwell in the tape movement. The mold cover will have been coated with paraffin wax, or if desired with some other release agent, as described above. Also the face 16 of the rim of the cover (and/or a corresponding marginal area of the tape) will have been coated with a pressure sensitive adhesive. As an aid, especially where manual application of the mold cover is employed, the upper face of the tape 40 may be printed at intervals with an outline of the rim of the mold.

Figure 6:
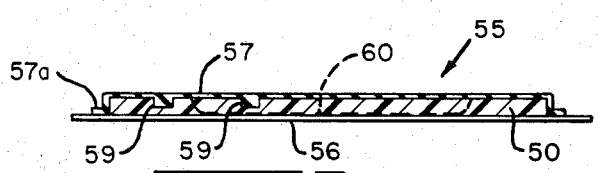
FIG. 6 is a view in vertical section through a thin film device as made by the method of FIG. 5.

Alternatively, and as shown in FIG. 5, the film of gel 50 formed at station A may be coated with a material such as Silgard. This may be done by spraying or by flowing the material onto the film of gel. The solvent, if one is used, is allowed to evaporate, such evaporation being accelerated if desired by a current of hot air, exposure to a heat lamp or other suitable means. The coating material is selected to harden, as by catalytic polymerization in the case of Silgard. Downstream from station B the tape is severed by a knife (not shown) to produce a complete package 55 (FIG. 6) composed of a base 56 (the severed portion of tape 40), a thin film of permeable aqueous gel 50 and a cover 57 formed of the coating material applied at station B and which laps over the edges at 57a around the entire periphery of the film 50. This cover also extends into wells 59 and channels 60 formed in the film by the mold 44. When it is desired to use the apparatus 55, a segment of the overlap 57a is lifted (being pried loose with a blade if necessary) and is stripped from the film 50, which is then ready for use. As in the case of the cover 10 in FIGS. 1, 2 and 4, the cover 57, by projecting into wells 59, etc., preserves their integrity during storage.

Figure 7:
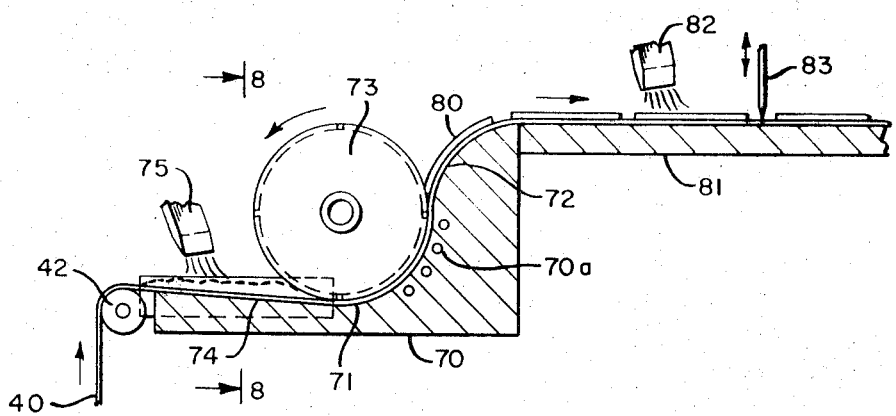
FIG. 7 is a diagrammatic drawing showing a continuous method of manufacturing thin film devices.
Figure 8:
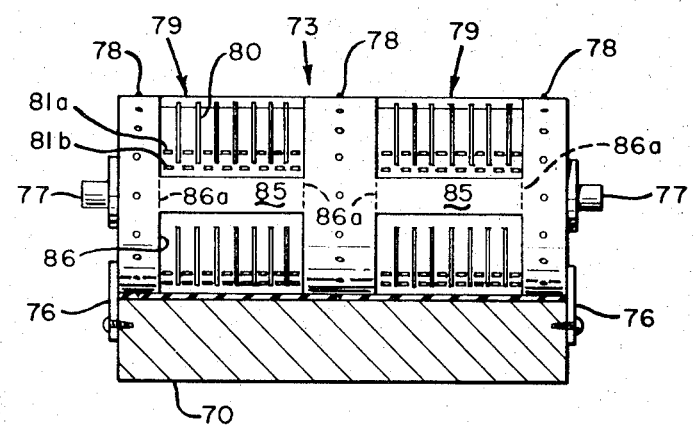
FIG. 8 is a view taken along the line 9—9 of FIG. 7 showing in elevation the roller used to fabricate thin film devices.

Referring now to FIGS. 7 and 8 equipment is there shown for continuous fabrication of apparatus of the present invention. This equipment comprises a continuous tape 40, a tank 41 and solvent 42 and a guide roller 42a as in FIG. 5. A block 70 is shown which is formed with passages 70a for circulation of cooling fluid. The block 70 has a concave portion at 71 and a convex portion at 72. A roller is provided at 73 which is nested in the concave portion 71 of the block 70 and at the lower end of a sloping portion 74. An applicator such as a nozzle is provided at 75. Referring more particularly to FIG. 8, at opposite sides of the sloping portion 74 of the block 70 and at opposite ends of the roller 73 retainer plates 76 are provided. The roller 73 is provided with trunions 77 by which the roller is rotatably supported in a suitable framework (not shown). The roller 73 is provided with sprocket teeth 78 which are intended to engage mating holes in the tape 40 so that the tape moves synchronously with the rotary motion of the roller 73. Alternatively, engagement of the tape and roller may be frictional and without a sprocket arrangement. The roller 73 is shown formed with mold units 79, each of which has a depth equal to the desired thickness of the film of gel, that is preferably not more than 1 mm and most preferably about one-half mm or less. Each mold unit comprises ribs or risers 80 and well forming projections 81. The ribs 80 extend to the periphery of the roller and therefore contact the tape 40. The well forming projections 81 preferably terminate short of the periphery of the roller and therefore do not contact the tape 40. Any desired number of mold units 79 may be provided, four being shown on one face of the roller in FIG. 8, there being four on the other face, although any number desired may be used.

In operation the tape 40 is moved continuously through the apparatus by reason of engagement of sprocket 78 with holes in the tape (or by frictional engagement). Such movement is preferably at a uniform rate such that liquid gel material may be supplied at a uniform rate by means of the applicator 75 to maintain an adequate pool of liquid or semi-solid gel in the well formed by the sloping section 74 of block 70 and the retainer plates 76. If need be, heat may be applied to this pool to maintain it in adequately fluid condition. As each mold unit 79 rotates into contact with this pool of gel it will be filled with gel and will rotate into the cooled sector of its cycle. Cold fluid circulating through the passages 70a in the block 70 and, if desired, through similar passages (not shown) in the roller 73 acts to solidify the liquid gel thus trapped in each mold unit 79. During transit along the concave portion 71 of the block 70 this trapped body of gel solidifies. There results from this mode of operation a multiplicity of films 80 of solidified gel each imprinted with wells and troughs formed by the well forming projections 81 and the ribs 80. The convex portion 72 of the block 70 provides a reverse bend which assists in separation of each film of gel 80 from the roller. These films of gel, supported on the tape 40, pass along a table 81 and, at an appropriate point, a cover such as that shown in FIG. 1 is applied manually or automatically by suitable means (not shown) or, preferably, as shown in the FIG. 7, the film is coated at 82 with a material as described above in connection with FIG. 5. Subsequently a knife 83 is used to sever the tape 40, resulting in the production of individual packages such as that shown at 55 in FIG. 6.

In FIG. 8 the cylinder 73 is shown with longitudinal segments 85 separating the mold units 79. Alternatively, these segments may be omitted, i.e., the dotted lines 86a in FIG. 8 represent continuations of the side walls 86 of the respective mold units 79. In such case, the cylinder 73 is formed with one or more (two being indicated in FIG. 8) continuous circumferential recesses with ribs 80 and well forming ribs 81 located therein. As a result, the product issuing from the cylinder at the convex portion 72 of block 70 comprises not only a continuous tape 40 but also a continuous film (or two or more continuous films) of gel with wells (and such other impressions as desired) formed therein at intervals. Covers may be applied as described above, and in the case of a coating as shown in FIG. 7, this cover may be continuous. The continuous, tape-like laminar product may be severed into segments as and when desired, or it may be wound up in continuous form into a roll for subsequent use, severing, etc.

Further, wells and troughs need not be formed in the film, whether formed in separate segments as shown in FIG. 7, or as a continuous tape as just described. In such case, if sample receiving wells are needed, they may be formed subsequently. Also specimens may be applied to plain film, i.e., film formed without an imprinted pattern of wells, etc., in the manner described above.

Figure 9:
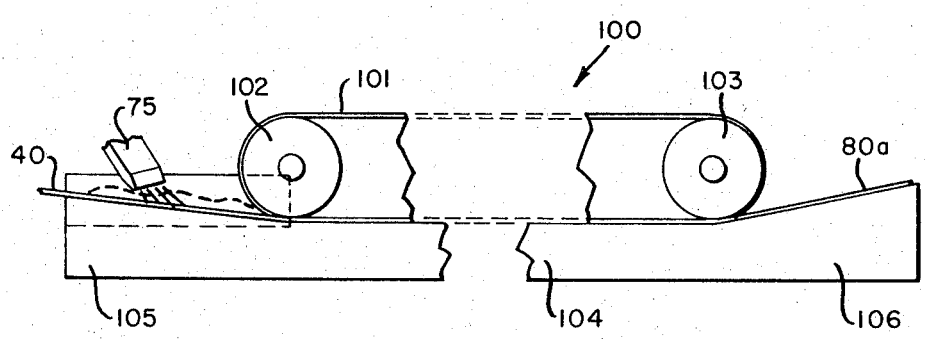
FIG. 9 is a fragmentary view showing an alternative to the apparatus of FIGS. 7 and 8.

Referring now to FIG. 9, an alternative to the cylinder 73 of FIGS. 7 and 8 is shown. This alternative, generally designated as 100, comprises an endless member 101 extending about wheels or sprockets 102 and 103 (with intermediate wheels or sprockets if needed). A table 104 has a downwardly sloping section 105 at the input end (the lower reach of the member 101 moving from left to right), and an upwardly sloping section 106 at the other end. The endless member is formed with separate mold sections like sections 79, or with a continuous mold section, with or without well forming projections as at 81 and risers as at 80 as desired. That is to say, the endless member 101 is, in effect, a transformed cylinder, lengthened out and having an operative, mold forming configuration. Tape is shown at 40, a supply nozzle at 75 and film 80a on the tape is also shown. An advantage of the apparatus of FIG. 9 is that it provides an elongated cooling path wherein the molding element (endless member 101) has sufficient length to allow solidification of the film of gel. Cooling fluid may be passed through the endless member 101 and/or the table 104 and/or a current of cold air may be applied to hasten solidification of the gel.

In those embodiments of the invention in which the film is plain and is not imprinted with wells and the like whose integrity must be preserved, the film of gel, after being formed, may be covered with a non-adherent sheet material such as polyethylene film coated with a release agent such as silicone release agent or paraffin wax, and the resulting packages may be stacked one on top of the other. Edge sealing to prevent evaporation of the gel may be provided by overlap of the overlying sheet material, by heat sealing such overlap, etc., or by packaging the film in a tight container which seals the exposed edges.

Figure 10:
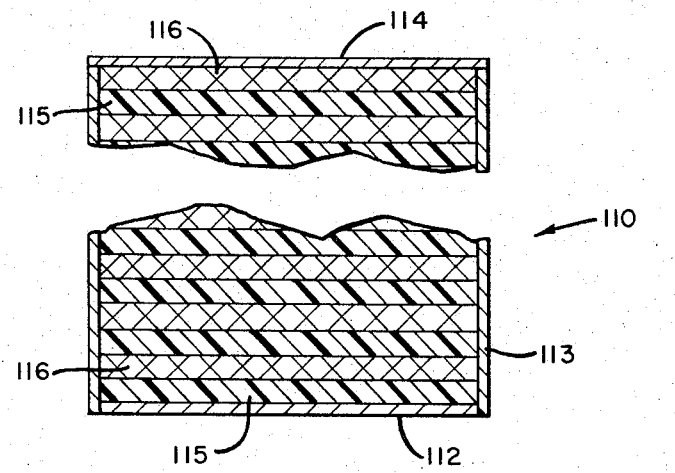
FIG. 10 is a view in vertical section of a stack of devices in accordance with the invention.

A packaged product formed in this manner is shown in FIG. 10. The package is generally designated as 110 and it comprises a bottom closure 112, side walls 113 and a top closure 114. The parts 112, 113 and 114 may be integral and they may be made of polyethylene, polystyrene or any other suitable material. Within this container are a multiplicity of units each comprising a base 115 and a film of permeable gel 116. The top surface of each base is adherent to the gel and the bottom surface is nonadherent to the gel. For example the base members 115 may be made of polystyrene, which is adherent and the bottom surface of each polystyrene base may be coated wit a release agent such as a silicone release agent or paraffin wax. Therefore, when the package is opened, the top base member 115 may be stripped from the stack with the superimposed film of gel adhering to it but the layer of gel beneath being non-adherent. The arrangement shown in FIG. 10 with each base 115 beneath and the adhering film of gel above, may be reversed, i.e., the top surface of each base 115 may be made non-adherent and the bottom surface may be made adherent. In effect, in this variant, the package 110 in FIG. 10 is merely inverted so that 112 becomes the top and 114 becomes the bottom.

Figure 11:
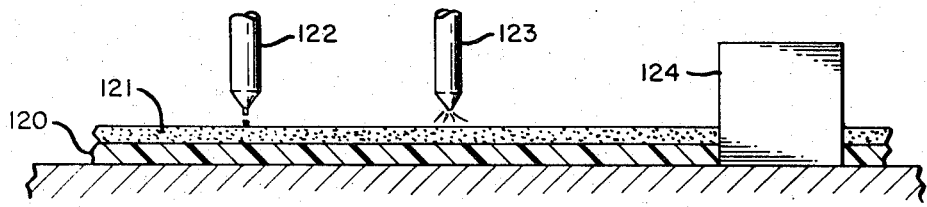
FIG. 11 is a diagrammatic drawing showing a continuous method of analysis employing the thin film technique of my invention.

Another embodiment of the invention is shown in FIG. 11. In this embodiment a length of tape 120 is provided which travels continuously or by increments along a table 121 in the direction shown. Adhering to the tape 120 is a film 121 of permeable aqueous gel. This gel, which may be as described above, may be applied in any manner, e.g., by brushing, squirting, spraying or dipping. It is, preferably, a thin film, preferably not more than about 0.3–0.5 mm and it is uniform in thickness. Such uniformity can be achieved by various means, e.g., by passing the tape beneath a roller or a doctor blade.

The layer of gel 121 may, if desired, have sample receiving wells formed in it such as the wells 29a and 29b in FIGS. 3 and 4. However, there need be no such wells.

The film of gel 121 may be uniformly impregnated with a reagent, e.g., by premixing the gel and reagent before applying it to the tape 120. The tape is moved beneath a pipette 122 which applies a measured amount of the unknown. If the tape is moved slowly, or if the pipette is caused to undergo a cycle in which it moves forwardly with and at the rate as the tape and then quickly rearwary to its starting position, the tape may move continuously. Alternatively the tape may be moved by increments and the unknown added during each pause between increments of forward movement.

Then the film 121 may be processed (after it has travelled a sufficient distance or has paused long enough for the reaction between reagent and unknown to be completed) in any suitable manner. For example, in the analysis of serum protein, the serum protein is applied by the pipette 122 and any suitable dyestuff such as 8-anilino naphthalene-1-sulfonic acid is applied by means of a nozzle 123. The selected dyestuff is one like 8-anilino naphthalene-1-sulfonic acid which will attach itself to the protein undergoing analysis and in so doing will become fluorescent in proportion to the amount of protein. By this means the amount of protein (the reagent dyestuff being added in excess) can be determined by fluorometry. Other dyestuffs than 8-anilino naphthalene-1-sulfonic acid may, of course, be used provided they function in this manner, i.e., they are non-fluorescent but attach themselves to protein and become fluorescent in proportion to the amount of protein-dyestuff complex. In the case of 8-anilino naphthalene-1-sulfonic acid, it is preferably used in the form of an acid solution e.g., 30 mgs. of the dyestuff in 100 ml. of 5–10 percent aqueous acetic acid solution.

If desired a fixing step may be interposed between pipete 122 and nozzle 123 to fix the protein, e.g., a dilute aqueous solution of formaldehyde and perchloric acid may be sprayed onto the area to which serum protein has been applied.

After the reagent has been applied by nozzle 123, after a fixing step (if any) has been carried out and after such period of time as is required for reaction of reagent with the protein to be completed, the tape is passed through a fluorometer 124 which may be provided with a readout to record the value of the determination on a printed tape and/or on a screen.

8-anilino naphthalene-1-sulfonic acid is unstable in aqueous solution if held for any great length of time; it should be used when freshly prepared. This leads to another embodiment of the invention, as follows: A film is provided as at 121 in FIG. 11, or in any other form in accordance with the present invention. 8-anilino naphthalene-1-sulfonic acid is stable for long periods of time if it is dry. The film 121 is impregnated with this reagent and is then dried, e.g., by application of mild heat and/or vacuum. The reagent is reactivated when moistened, which may be accomplished by dipping the film in or spraying it with water just before use. In many cases the water in the sample of unknown, e.g., blood serum, will serve the same purpose. In general, permeable films, preferably but not necessarily made in accordance with the present invention, may be impregnated with a labile reagent which is stable in anhydrous environment but which is unstable in the presence of moisture, and this film may be dried, stored, shipped and delivered in dry form; and reactivated by adding moisture at or just before the time of use.

Rater than using a tape, a disc formed of the same material may be employed having an adhering film of gel, and this disc may be rotated in a turret type of apparatus wherein reagent and/or unknown may be applied at different points and a sector of the disc may rotate through a fluorometer.

In the tape and disc embodiments of the invention illustrated by FIG. 11 the extreme thinness and uniformity of the film of gel are advantageous not only for the reasons previously stated but because the steps involved, moistening, drying, curing, etc. can be accomplished very quickly. If thick layers of gel are employed, the time required for these steps may be prohibitive.

In general optimum thickness and optimum uniformity can be determined by criteria such as those mentioned immediately above and elsewhere above. I have found that thickness less than about 1 mm should be used, preferably not more than about 0.5 mm; and that departures from average thickness preferably do not exceed about 10 percent, most advantageously not by more than about 7 percent.

It will therefore be apparent that novel and very useful methods and apparatus have been provided.

I claim:

1. Permeable gel apparatus adapted for diffusion analysis comprising a stack of superimposed units each comprising a base member and a layer of aqueous, permeable gel in adherent contact with one surface of the base, the other surface of each base in contact with an adjacent layer of gel being non-adherent to such gel.

2. Apparatus of claim 1 wherein said layers of gel have a thickness not exceeding about one millimeter.

3. Permeable gel apparatus adapted for diffusion analysis comprising a continuous strip of flexible base material and a layer of aqueous, permeable gel adhering to one surface of the base, the other surface of the base being non-adherent to the gel, said strip being rolled up into cylindrical form.

* * * * *